United States Patent
Mishra et al.

(10) Patent No.: US 10,528,503 B1
(45) Date of Patent: Jan. 7, 2020

(54) REAL-TIME DYNAMIC ADDRESSING SCHEME FOR DEVICE PRIORITY MANAGEMENT

(71) Applicant: QUALCOMM Incorporated, San Diego, CA (US)

(72) Inventors: Lalan Jee Mishra, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/036,416

(22) Filed: Jul. 16, 2018

(51) Int. Cl.
G06F 13/00 (2006.01)
G06F 13/366 (2006.01)
G06F 13/42 (2006.01)
G06F 13/16 (2006.01)

(52) U.S. Cl.
CPC ........ *G06F 13/366* (2013.01); *G06F 13/1605* (2013.01); *G06F 13/4282* (2013.01)

(58) Field of Classification Search
CPC . G06F 13/366; G06F 13/1605; G06F 13/4282
USPC ................. 710/107, 105, 240–244
See application file for complete search history.

(56) References Cited

U.S. PATENT DOCUMENTS

| | | | | |
|---|---|---|---|---|
| 7,009,995 B1* | 3/2006 | Bohrer | ................ | H04J 3/0652 370/460 |
| 7,039,743 B2* | 5/2006 | Merkin | ............... | G06F 13/4081 702/127 |
| 8,239,597 B2 | 8/2012 | Wishneusky | | |
| 8,665,882 B2* | 3/2014 | Hall | ................ | H04L 12/40163 370/395.42 |
| 2004/0142722 A1* | 7/2004 | Everett | ............ | H04L 12/40006 455/550.1 |
| 2005/0216644 A1* | 9/2005 | Dickens | .............. | G06F 11/2221 710/309 |
| 2010/0312935 A1* | 12/2010 | Higuchi | ............... | G06F 13/374 710/112 |

(Continued)

OTHER PUBLICATIONS

Davis R.I., et al., "On Priority Assignment for Controller Area Network When Some Message Identifiers are Fixed", RTNS '15 Proceedings of the 23rd International Conference on Real Time and Networks Systems, 2015, ACM, ISBN: 978-1-4503-3591-1, DOI: http://dx.doi.org/10.1145/2834848.2834866, pp. 279-288.

*Primary Examiner* — Tim T Vo
*Assistant Examiner* — Kim T Huynh
(74) *Attorney, Agent, or Firm* — Loza & Loza LLP

(57) ABSTRACT

Systems, methods, and apparatus for improving bus latency are described. A method performed at a device coupled to a serial bus includes using a dynamic identifier in a first transaction conducted over a first serial bus. The dynamic identifier includes unique identifier and variable identifier portions. The device participates in a sequence of bus arbitrations until the slave device gains access to the first serial bus or a second serial bus. The value of the variable identifier portion may be increased after each bus arbitration that does not result in a grant of access to the first serial bus, and cleared after each bus arbitration that results in a grant of access to the first serial bus. A second transaction may be conducted over the first serial bus after gaining access to the first serial bus. The value of the dynamic identifier defines slave device priority for bus arbitrations.

30 Claims, 12 Drawing Sheets

(56) References Cited

U.S. PATENT DOCUMENTS

2011/0007688 A1    1/2011  Veeravalli et al.
2015/0370735 A1*  12/2015  Pitigoi-Aron ......... G06F 13/364
                                                     710/110
2016/0124896 A1*   5/2016  Pitigoi-Aron ....... H04L 25/4923
                                                     710/110
2018/0357194 A1*  12/2018  Ulmer ................. G06F 13/3625

* cited by examiner

SPMI Register 0 Write

| SPMI Bus Arb. | SSC | Device ID | | Command Code | | P | BP | A/N | BP |
|---|---|---|---|---|---|---|---|---|---|
| 18 cycles | | 1 | 0 | SA[3:0] | 1 | Data[6:0] | | | |

RFFE Register 0 Write

| SSC | Device ID | | Command Code | | P | BP |
|---|---|---|---|---|---|---|
| | 1 | 0 | SA[3:0] | 1 | Data[6:0] | |

REAL-TIME DYNAMIC ADDRESSING SCHEME FOR DEVICE PRIORITY MANAGEMENT

TECHNICAL FIELD

The present disclosure relates generally to serial communication over a shared serial bus and, more particularly, to optimizing latencies associated with time-critical data transmitted over the shared serial bus.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a multi-drop serial bus or a parallel bus. General-purpose serial interfaces known in the industry include the Inter-Integrated Circuit (I2C or I²C) serial bus and its derivatives and alternatives. The Mobile Industry Processor Interface (MIPI) Alliance defines standards for I3C, the Radio Frequency Front-End (RFFE) interface and other interfaces.

In one example, the I3C serial bus may be used to connect sensors and other peripherals to a processor. In some implementations, multiple bus masters are coupled to the serial bus such that two or more devices can serve as bus master for different types of messages transmitted on the serial bus. In another example, the RFFE interface defines a communication interface for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communications device, multiple antennas and radio transceivers may support multiple concurrent RF links In another example, system power management interface (SPMI) defined by the MIPI Alliance provides a hardware interface that may be implemented between baseband or application processors and peripheral components. In some implementations, the SPMI is deployed to support power management operations within a device.

In many instances, a multi-drop serial bus may be provided to support high-priority, low-latency communication between an application processor and certain peripherals, and other lower-priority communication. Latency can be adversely affected when multiple devices coupled to the serial bus are concurrently active and attempting to gain bus access for transmission initiation. Degraded latencies can lead to a failure to meet certain applications performance limits. As mobile communication devices continue to include a greater level of functionality, improved serial communication techniques are needed to improve latencies and/or handling of priority traffic on a serial bus that couples peripherals and application processors.

SUMMARY

Certain aspects of the disclosure relate to systems, apparatus, methods and techniques that can support increased data rates for a serial bus without increasing bus clock frequency and without modifying encoding of the data transmitted on the data line.

In various aspects of the disclosure, a method performed at a device coupled to a serial bus includes using a dynamic identifier in a first transaction conducted over a first serial bus. The dynamic identifier may include a unique identifier portion and a variable identifier portion. The method further includes participating in a sequence of bus arbitrations until the slave device gains access to the first serial bus or a second serial bus. The method further includes increasing the value of the variable identifier portion after each bus arbitration that does not result in a grant of access to the first serial bus, and clearing the variable identifier portion after each bus arbitration that results in a grant of access to the first serial bus. The method further includes conducting a second transaction over the first serial bus after gaining access to the first serial bus. The slave device the slave device may have a priority during each bus arbitration defined by a binary-weighted combination of value of the variable identifier portion and value of the unique identifier portion.

In one aspect, the variable identifier portion is cleared or ignored while the first transaction is being conducted.

In one aspect, participating in the sequence of bus arbitrations includes initializing the variable identifier portion such that the unique identifier portion defines the initial priority of the slave device during a first bus arbitration in the sequence of bus arbitrations.

In one aspect, increasing the value of the variable identifier portion includes incrementing the variable identifier portion.

In one aspect, the method further includes conducting the second transaction over the second serial bus when the value of the variable identifier portion equals or exceeds a maximum value defined for the slave device.

In one aspect, the method further includes requesting access to the second serial bus when the value of the variable identifier portion equals or exceeds a maximum value defined for the slave device, and continuing participation in the sequence of bus arbitrations when access to the second serial bus is denied. Requesting access to the second serial bus includes using a high-priority identifier to participate in arbitration for access to the second serial bus.

In one aspect, the method further includes terminating participation in the sequence of bus arbitrations after gaining access to the first serial bus. The slave device may participate in the sequence of bus arbitrations while the slave device has data to be transmitted to another device coupled to the first serial bus. The dynamic identifier has a length defined for a slave identifier by a protocol used to manage communication over the first serial bus.

In various aspects of the disclosure, a slave device includes an interface circuit adapted to couple the apparatus to a first serial bus, and a processor. The processor may be configured to use a dynamic identifier in a first transaction conducted over a first serial bus, where the dynamic identifier includes a unique identifier portion and a variable identifier portion. The processor may be configured to participate in a sequence of bus arbitrations until the slave device gains access to the first serial bus or a second serial bus. The processor may be configured to increase the value of the variable identifier portion after each bus arbitration that does not result in a grant of access to the first serial bus, and clearing the variable identifier portion after each bus arbitration that results in a grant of access to the first serial bus. The processor may be configured to conduct a second transaction over the first serial bus after gaining access to the first serial bus. The slave device may have a priority during each bus arbitration defined by a binary-weighted combination of value of the variable identifier portion and value of the unique identifier portion.

In various aspects of the disclosure, a processor-readable storage medium has code for using a dynamic identifier in a first transaction conducted over a first serial bus, where the dynamic identifier includes a unique identifier portion and a variable identifier portion. The processor-readable storage medium may have code for participating in a sequence of bus arbitrations until a slave device gains access to the first serial bus or a second serial bus. The processor-readable storage medium may have code for increasing the value of the variable identifier portion after each bus arbitration that does not result in a grant of access to the first serial bus, and clearing the variable identifier portion after each bus arbitration that results in a grant of access to the first serial bus. The processor-readable storage medium may have code for conducting a second transaction over the first serial bus after gaining access to the first serial bus. The slave device may have a priority during each bus arbitration defined by a binary-weighted combination of value of the variable identifier portion and value of the unique identifier portion.

In various aspects of the disclosure, an apparatus includes means for modifying a dynamic identifier, where the dynamic identifier is used in a first transaction conducted over a first serial bus, and where the dynamic identifier includes a unique identifier portion and a variable identifier portion. The apparatus includes means for participating in a sequence of bus arbitrations. Participation in the sequence of bus arbitrations continues until the apparatus gains access to the first serial bus or a second serial bus. The apparatus includes means for conducting transactions over the first serial bus. A second transaction may be conducted after the apparatus has gained access to the first serial bus. The apparatus has a priority during each bus arbitration defined by value of the dynamic identifier. The means for modifying the dynamic identifier may be configured to increase the value of the variable identifier portion after each bus arbitration that does not result in a grant of access to the first serial bus, and clear the variable identifier portion after each bus arbitration that results in a grant of access to the first serial bus.

BRIEF DESCRIPTION OF THE DRAWINGS

FIG. 5 illustrates datagram structures for Register-0 Write command in accordance with SPMI and RFFE protocols.

DETAILED DESCRIPTION

Figure 1:
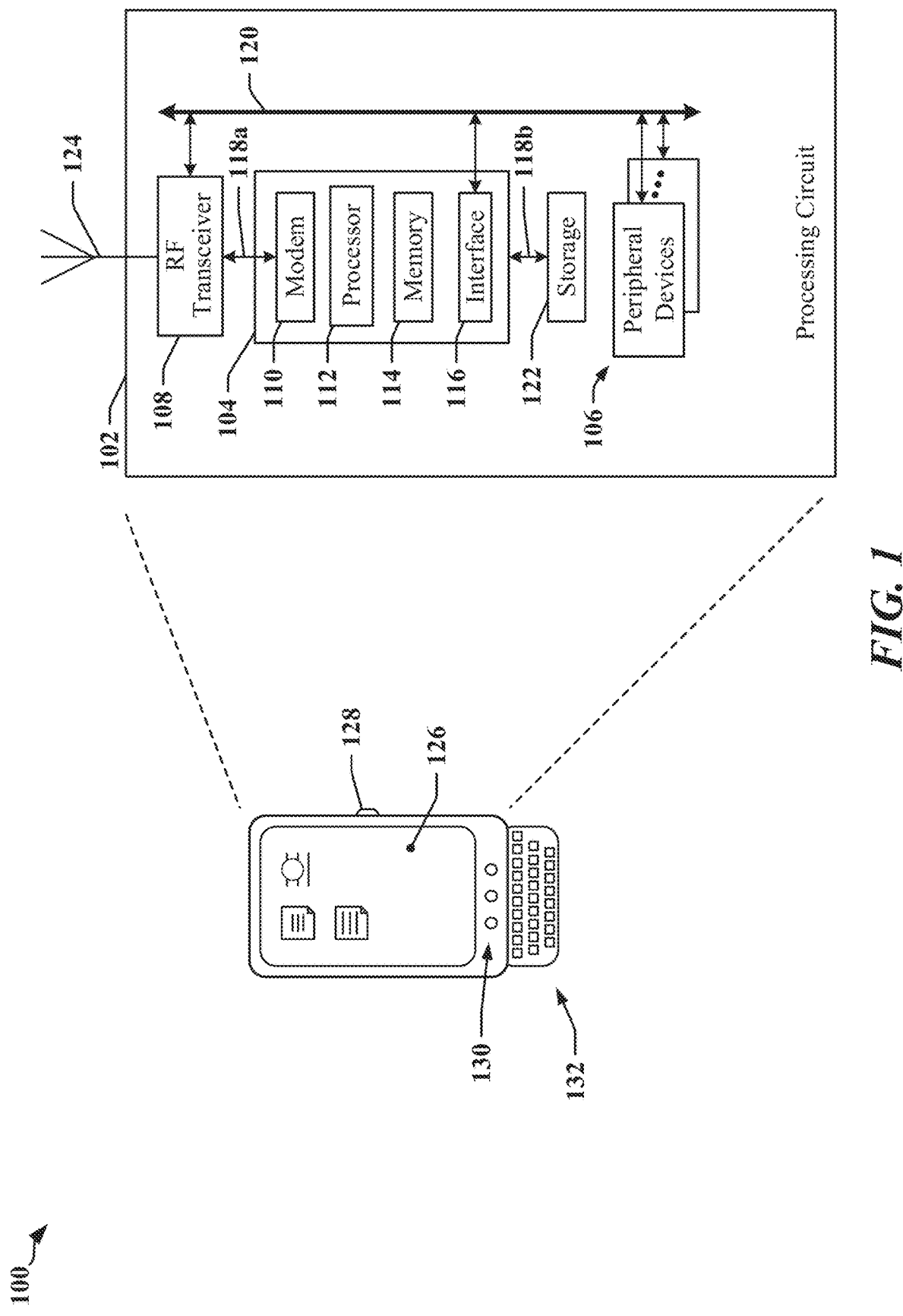
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. For example, the serial bus may be operated in accordance with an I2C, I3C, SPMI, and/or RFFE protocol, or other protocol that may be configured for half-duplex operation. Increased utilization of serial buses, and/or the imposition of more stringent timing constraints in support of applications, peripherals and sensors can result in demand for reduced transmission latencies. Transmission latency may include the time required to terminate a transaction in process on the serial bus, bus turnaround (between transmit mode and receive mode), bus arbitration and/or command transmissions specified by protocol.

High bus latency can limit the capabilities and functionality of a serial bus in certain applications. For example, bus latency considerations may limit the number of radio frequency (RF) devices that can be coupled by an I3C, RFFE or SPMI bus. In some examples, multiple serial buses may be implemented to enable RF or other low-latency devices to communicate within tight time constraints, including where bus throughput, utilization and/or other operating characteristics are otherwise easily supported by a single bus.

When two or more devices vie for access to a serial bus in consecutive arbitration processes, a higher priority device can dominate the serial bus, shutting out lower priority devices. Aspects of the present disclosure enable lower priority devices to gain access to the serial bus when a higher-priority device is competing for access in consecutive arbitration processes.

A slave device adapted according to certain aspects disclosed herein may be configured to use a dynamic identifier in a first transaction conducted over a first serial bus, where the dynamic identifier includes a unique identifier portion and a variable identifier portion. The slave device may be configured to participate in a sequence of bus arbitrations until the slave device gains access to the first serial bus or a second serial bus. The slave device may be configured to increase the value of the variable identifier portion after each bus arbitration that does not result in a grant of access to the first serial bus, and clearing the variable identifier portion after each bus arbitration that results in a grant of access to the first serial bus. The slave device may be configured to conduct a second transaction over the first serial bus after gaining access to the first serial bus. The slave device may have a priority during each bus arbitration defined by value of the dynamic identifier.

Certain aspects disclosed herein may be applicable to a serial bus operated in accordance with an I2C, I3C, SPMI, and/or RFFE protocol, or other protocol. Certain aspects are applicable to a serial bus operated in half-duplex mode or full-duplex mode. Certain aspects are applicable to point-to-point interfaces including UART-based interfaces, line multiplexed UART (LM-UART) interfaces, and virtual GPIO (VGI) and messaging interfaces. Certain aspects are applicable to multipoint interfaces and/or interfaces operated in point-to-point mode.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
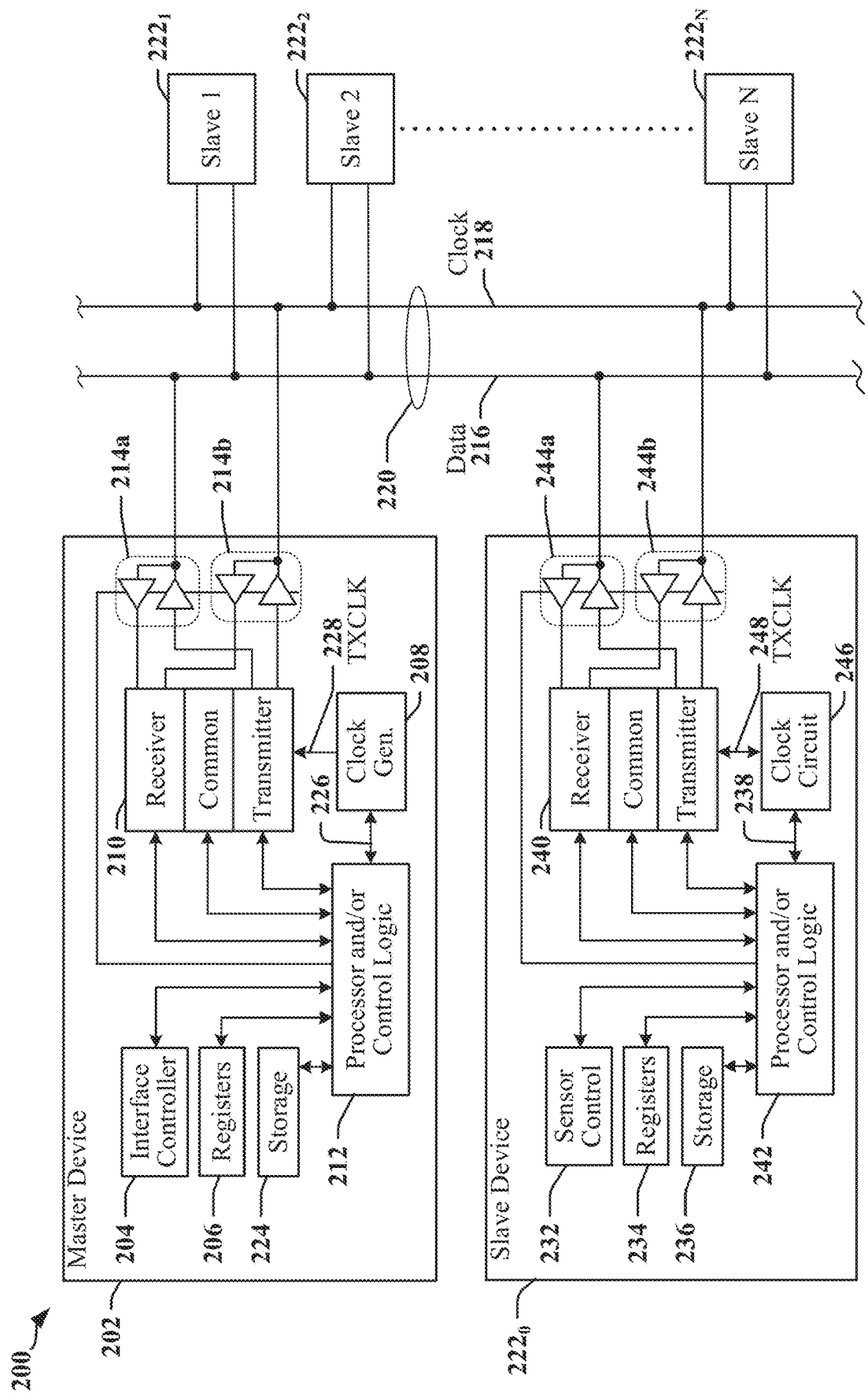
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an applications processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222_0$-$222_N$ may be used to control, manage or monitor a sensor device. Communications between devices 202 and $222_0$-$222_N$ over the serial bus 220 is controlled by a bus master 202. Certain types of bus can support multiple bus masters 202.

In one example, a master device 202 may include an interface controller 204 that may manage access to the serial bus, configure dynamic addresses for slave devices $222_0$-$222_N$ and/or generate a clock signal 228 to be transmitted on a clock line 218 of the serial bus 220. The master device 202 may include configuration registers 206 or other storage 224, and other control logic 212 configured to handle protocols and/or higher level functions. The control logic 212 may include a processing circuit such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clocks 238 may be used by the control logic 242 and other functions, circuits or modules.

The serial bus 220 may be operated in accordance with RFFE, I2C, I3C, SPMI, or other protocols. At least one device 202, $222_0$-$222_N$ may be configured to operate as a master device and a slave device on the serial bus 220. Two or more devices 202, $222_0$-$222_N$ may be configured to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

Figure 3:
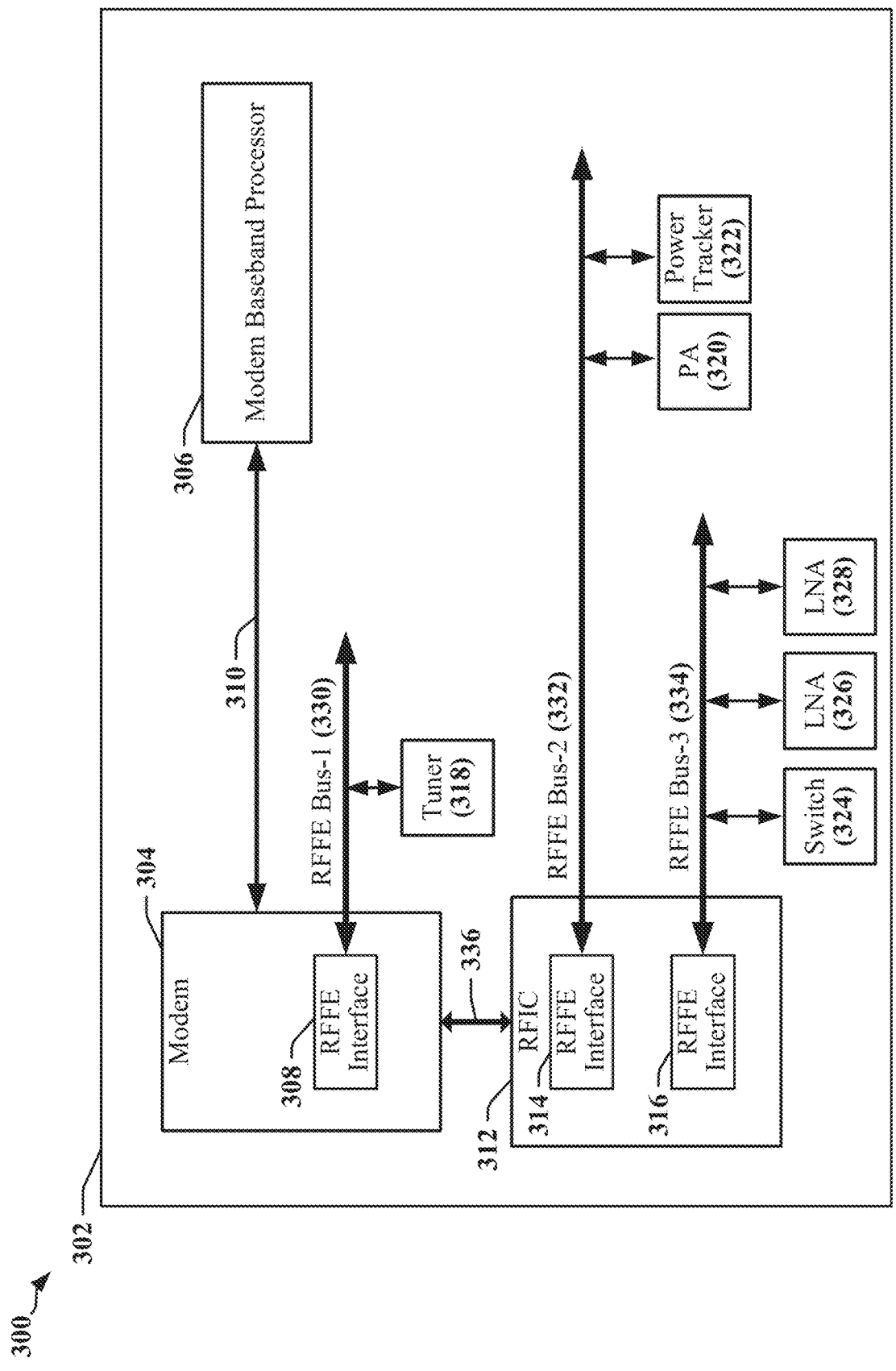
FIG. 3 illustrates a device configuration for coupling various radio frequency front-end devices using multiple RFFE buses.

FIG. 3 is a block diagram 300 illustrating a second example of a configuration of communication links in a chipset or device 302 that employs multiple RFFE buses 330, 332, 334 to couple various RF front-end devices 318, 320, 322, 324, 326 328. In this example, a modem 304 includes an RFFE interface 308 that couples the modem 304 to a first RFFE bus 330. The modem 304 may communicate with a baseband processor 306 and a Radio-Frequency IC (RFIC 312) through one or more communication links 310, 336. The illustrated device 302 may be embodied in one or more of a mobile communication device, a mobile telephone, a mobile computing system, a mobile telephone, a notebook computer, a tablet computing device, a media player, a gaming device, a wearable computing and/or communications device, an appliance, or the like.

In various examples, the device 302 may be implemented with one or more baseband processors 306, modems 304, RFICs 312, multiple communications links 310, 336, multiple RFFE buses 330, 332, 334 and/or other types of buses. The device 302 may include other processors, circuits, modules and may be configured for various operations and/or different functionalities. In the example illustrated in FIG. 3, the Modem is coupled to an RF tuner 318 through its RFFE interface 308 and the first RFFE bus 330. The RFIC 312 may include one or more RFFE interfaces 314, 316, controllers, state machines and/or processors that configure and control certain aspects of the RF front-end. The RFIC 312 may communicate with a PA 320 and a power tracking module 322 through a first of its RFFE interfaces 314 and the second RFFE bus 332. The RFIC 312 may communicate with a switch 324 and one or more LNAs 326, 328.

Figure 4:
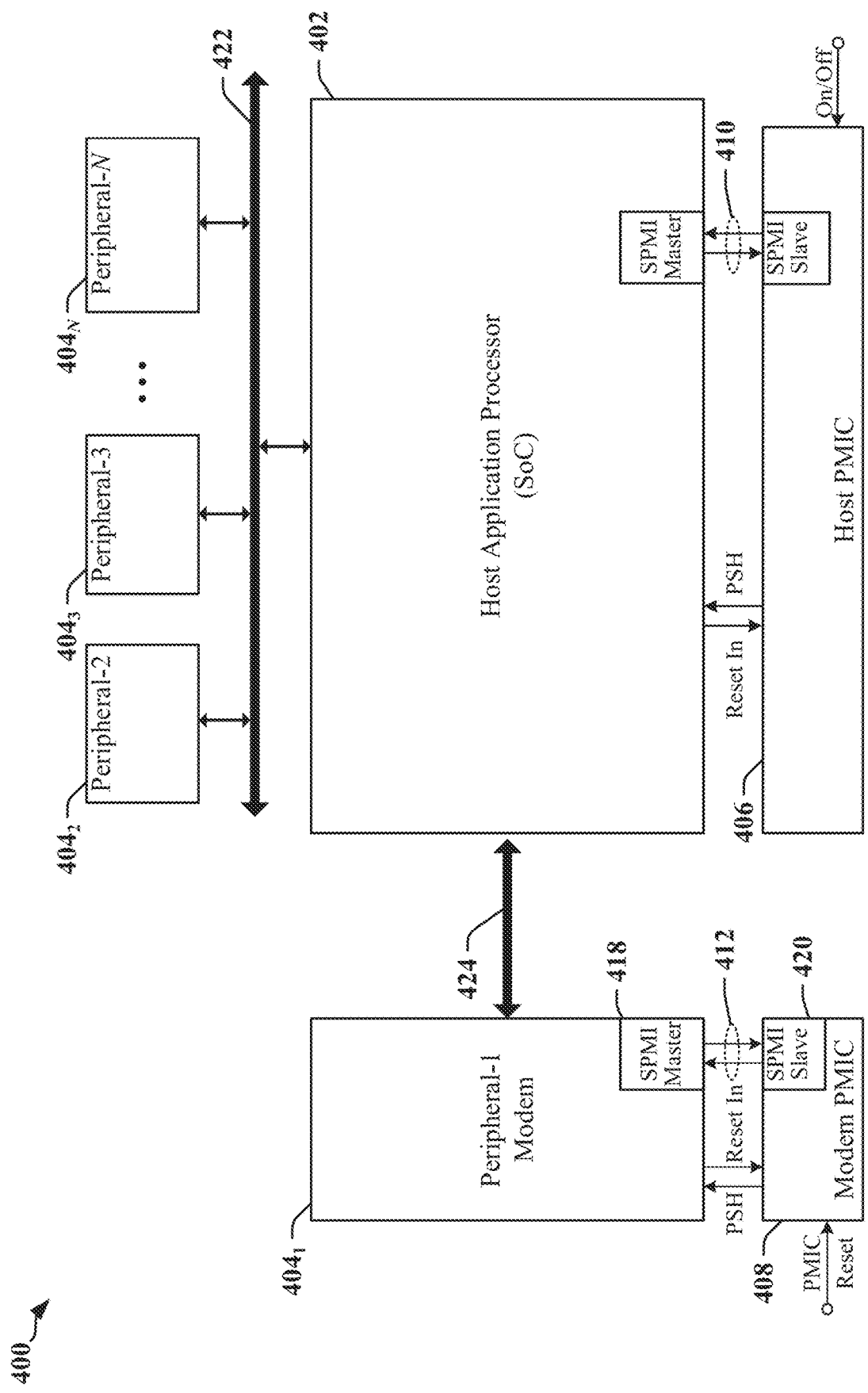
FIG. 4 illustrates a device that employs an SPMI bus to couple various devices in accordance with certain aspects disclosed herein.

The MIPI Alliance system power management interface (SPMI) specifies a hardware interface that may be implemented between baseband or application processors and peripheral components to support a variety of data communication functions including data communication related to power management operations. FIG. 4 illustrates an example of a system 400 which includes data communication links 410, 412, where each of the data communication links 410, 412 is configured as a two-wire serial bus operated in accordance with SPMI protocols. In one example, a first data communication link 410 may be used to connect an integrated power controller of an application processor 402 with a voltage regulation system in a first power management integrated circuit (PMIC 406), and a second data communication link 412 may be used to connect an integrated power controller of a modem $404_1$ with a voltage regulation system in a second PMIC 408. The data communication links 410, 412 can be used to accurately monitor and control processor performance levels required for a given workload or application and dynamically control the various supply voltages in real time based on the performance levels. The data communication links 410, 412 can be used to carry other types of data between the application processor 402 and the first PMIC 406 and/or between the modem $404_1$ and the second PMIC 408. SPMI data communication links may be implemented as multi-drop serial links to connect a variety of different devices and to carry other types of data. Some SPMI data communication links may be optimized for real-time power management functions. Some SPMI data communication links may be may be used as a shared bus that provides high-speed, low-latency connection for devices, where data transmissions may be managed, according to priorities assigned to different traffic classes.

In the system 400 illustrated in FIG. 4, the application processor 402 that may serve as a host device on various data communication links 410, 422, multiple peripherals $404_1$-$404_N$, and one or more PMICs 406. The application processor 402 and the modem $404_1$ may be coupled to respective PMICs 406, 408 using power management interfaces implemented using SPMI masters 414, 418. The SPMI masters 414, 418 communicate with corresponding SPMI slaves 416, 420 provided in the PMICs 406, 408 to facilitate real-time control of the PMICs 406, 408. The application processor 402 may be coupled to each of the peripherals $404_1$-$404_N$ using different types of data communication links 410, 412. For example, the data communication links 410, 412 may be operated in accordance with protocols such as the RFFE, SPMI, I3C protocols.

Bus latency can affect the ability of a serial bus to handle high-priority, real-time and/or other time-constrained messages. Low-latency messages, or messages requiring low bus latency, may relate to sensor status, device-generated real-time events and virtualized general-purpose input/output (GPIO). In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

Multi-drop interfaces such as RFFE, SPMI, I3C, etc. can reduce the number of physical input/output (I/O) pins used to communicate between multiple devices. Protocols that support communication over a multi-drop serial bus define a datagram structure used to transmit command, control and data payloads. Datagram structures for different protocols define certain common features, including addressing used to select devices to receive or transmit data, clock generation and management, interrupt processing and device priorities. In this disclosure, the example of RFFE and SPMI protocols may be employed to illustrate certain aspects disclosed herein. However, the concepts disclosed herein are applicable to other serial bus protocols and standards. Some similarities exist between RFFE and SPMI datagram structures.

FIG. 5 illustrates datagram structures 500, 520 for Register-0 Write command in accordance with SPMI and RFFE protocols, respectively. Register-0 Write commands are transmitted in the shortest datagrams defined by both SPMI and RFFE protocols. In both protocols, the datagram structures 500, 520 commence with transmission of a two-bit sequence start condition (SSC 502, 522) followed by a four-bit device ID 504, 524 or other device identifier. The 8-bit command code 506, 526 is transmitted next. The 8-bit command code 506, 526 is the only currently-defined command code that has a most significant bit (MSB 512, 532) set to 1. The command code 506, 526 is followed by a parity bit 508, 528 and bus park signaling 510, 530. In SPMI protocols, an acknowledge/not acknowledge bit 514 is transmitted with second bus park signaling 516. Other SPMI and RFFE include additional fields including, for example, register address fields and one or more data bytes.

A device coupled to a multi-drop serial bus may be required to participate in a bus arbitration process when the device intends to initiate a communication. The device may be considered to have won the arbitration if the device obtains access to the multi-drop serial bus. In some examples, the devices wins the arbitration when a bus master and/or bus owner grants the device access to the multi-drop serial bus.

In some instances, the four-bit device ID 504, 524 may be instrumental in determining a winner of the arbitration process. In one example, device priority during arbitration is indicated by a binary-weighted device ID 504, 524 assigned to the device. In some conventional implementations, certain issues attach to arbitration processes that select winners based on the value of device IDs 504, 524. In one example, a device assigned a higher priority due to its binary-weighted device ID 504, 524 may unpredictably block bus access for other, lower-priority devices and lead to real-time control issues. In a multi-radio device such as a Smartphone, for example, control mechanisms related to RF Co-existence may not function properly when a high-priority device blocks access for one or more lower-priority devices. Time-critical applications, such as RF-Front-End control applications, rely on guaranteed bus access for all devices with latencies that fall within the specified timing boundaries. Certain aspects of this disclosure provide an address-based arbitration process that introduce a fairness scheme that can avoid blocking by high-priority devices.

Figure 6:
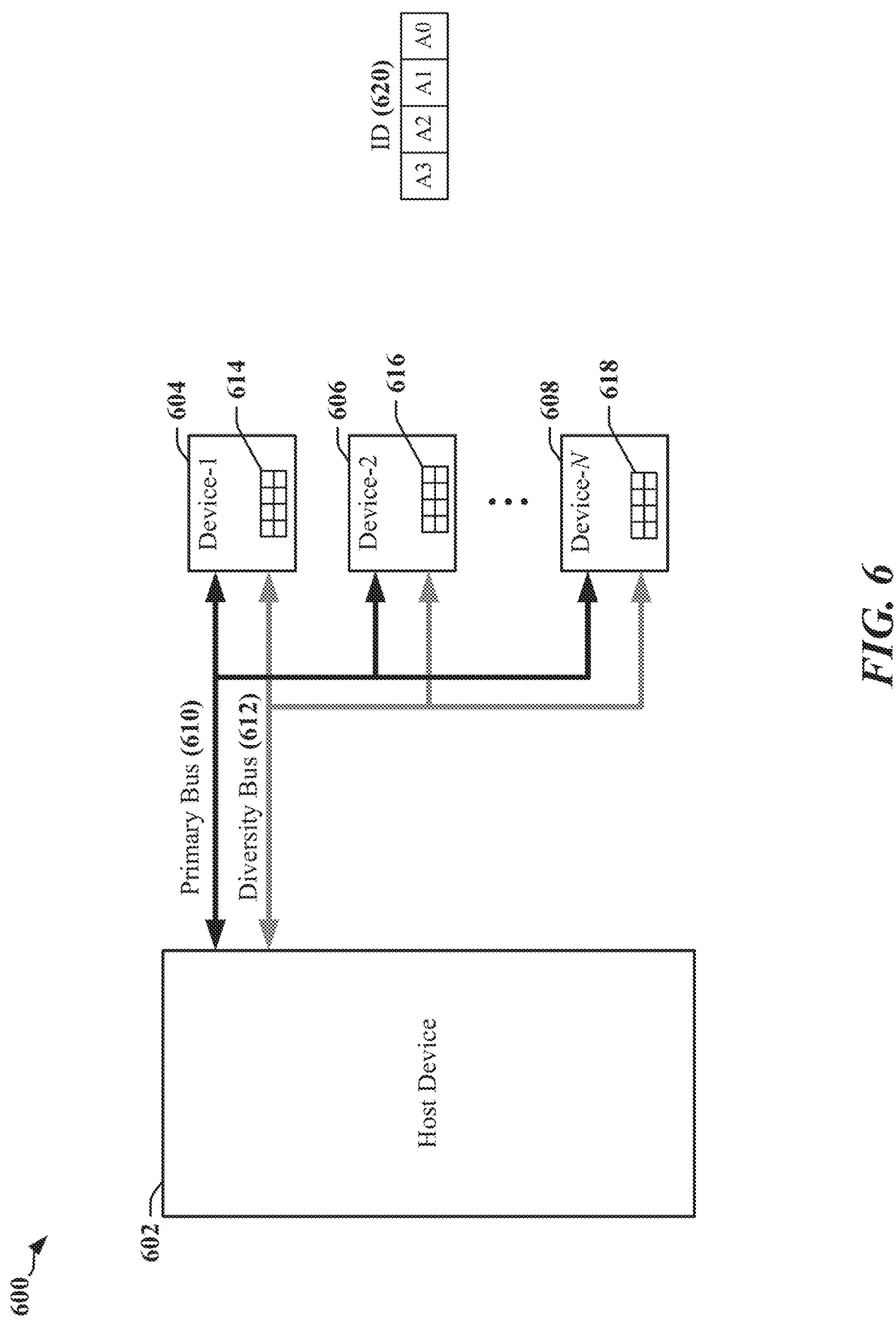
FIG. 6 illustrates a system that includes two serial buses to support low-latency communication between multiple devices in accordance with certain aspects disclosed herein.

Certain concepts disclosed herein may be applicable in implementations in which multiple buses can be used to communicate low-latency messages between two or more devices. FIG. 6 illustrates a system 600 that includes two serial buses 610, 612 to support low-latency communication between multiple devices 602, 604, 606, 608. A first bus may be designated as a primary bus 610 or primary channel for communicating low-latency messages, while a second bus may serve as a diversity bus 612 or diversity channel that provides communication path diversity and/or a backup channel for low-latency communication. The primary bus 610 and diversity bus 612 may be operated in accordance with the same protocol or different protocols. In the illustrated example, a host device 602 may serve as bus master on at least one of the two serial buses 610, 612, and may control access to one or both serial buses 610, 612. One or more slave devices 604, 606, 608 may be coupled to one or both of the serial buses 610, 612. The number of slave devices 604, 606, 608 that can be coupled to each serial bus 610 or 612 may be limited by the protocol used to operate the serial bus 610 or 612. For example, a maximum of 16 devices can be coupled to a serial bus 610, 612 operated according to an RFFE or SPMI protocol. Each device 604, 606, 608 may be assigned one or more device IDs 614, 616, 618. In some instances, each device 604, 606, 608 may be assigned identical IDs for use on two or more buses 610, 612.

The host device 602 and one or more slave devices 604, 606, 608 may be configured with two interfaces capable of communicating latency-sensitive messages over one or both of the serial buses 610, 612. In one example, the latency-sensitive messages may include coexistence messages. Coexistence messages are transmitted a multisystem platform to prevent or reduce instances of systems impinging on each other. The system 600 may include multiple instances of certain device types (e.g. switch 324, LNA 326, 328, PA 320 and other types of device) that may operate concurrently in a manner that can generate inter-device interference, or that could potentially cause damage to one or more devices. Devices that may interfere with one another may exchange coexistence management (C×M) messages to permit each device to signal imminent actions that may result in interference or conflict. C×M messages may be used to manage operation of shared components including a switch 324, LNA 326, 328, PA 320 and/or an antenna.

Low-latency and other messages may be sent through a primary interface and/or a diversity interface. Both interfaces may be active at the same time. Certain components of the system 600 may be configured to identify a latency budget and/or maximum acceptable latency for all possible communications, where the budget and/or link capacity information may be stored in a database that can be accessed in regard to each upcoming transmission. For each upcoming transmission, components of the system 600 may determine transmission latency expected through the primary and diversity interfaces, and whether a latency violation is expected to occur. Based on analysis of the latency expectations a transmitter may select the primary or diversity interface for sending the message. The system 600 may provide an alert mechanism for notifying other entities when a latency violation is anticipated.

Dynamic Addressing for Device Priority Management

Low-latency performance may be enhanced by providing a dynamic Slave-ID (SID) priority scheme. Dynamic SIDs may be enabled on the primary interface and/or on the diversity interface. If the primary interface has insufficient capacity or is other incapable of meeting latency requirements for a transaction, the transaction may be moved to the diversity interface. For the purposes of description, an implementation of dynamic SIDs is described with reference to a primary interface that is operated according to an RFFE or SPMI protocol.

Figure 7:
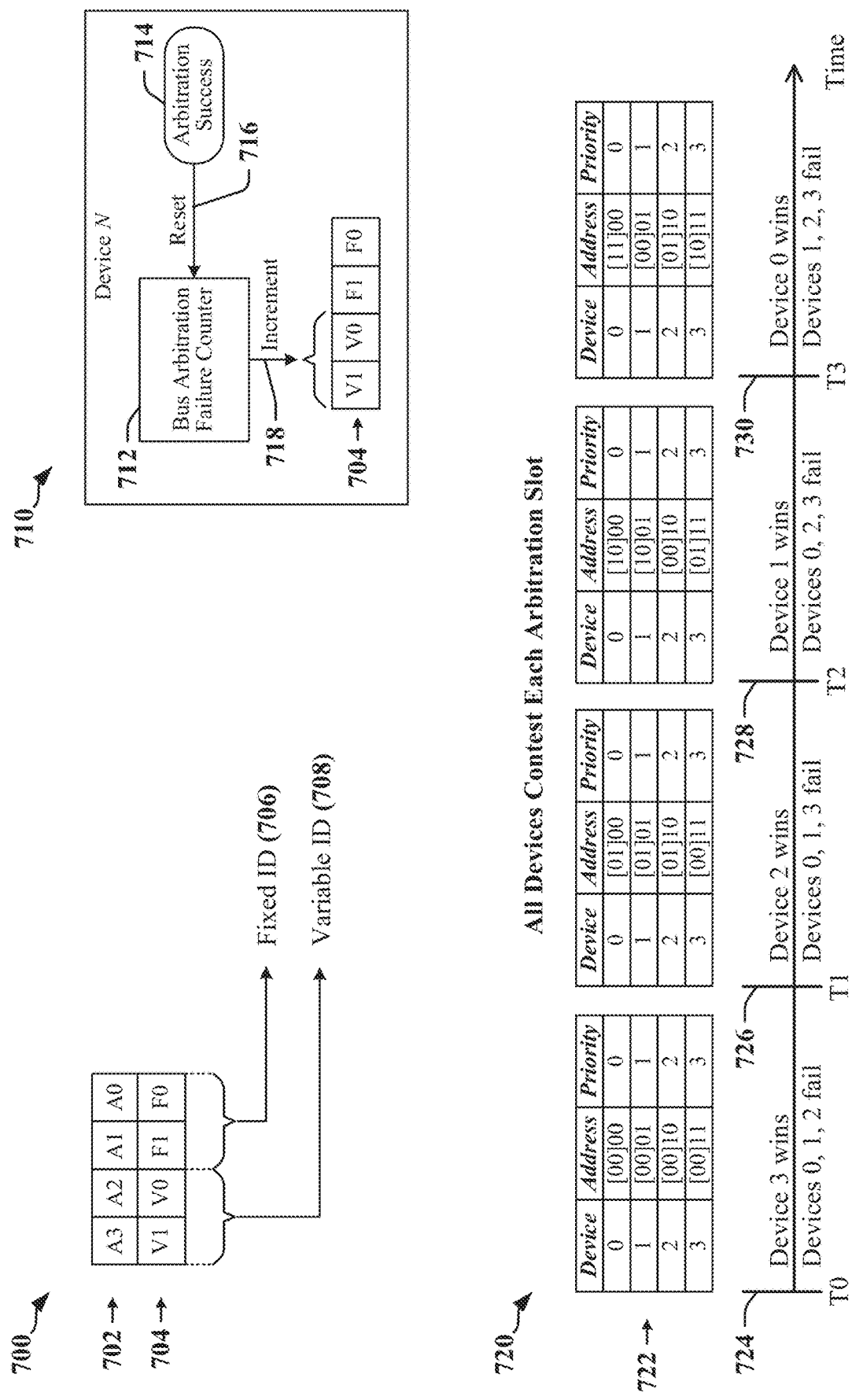
FIG. 7 illustrates a first example of the operation of the dynamic slave identifier implementation for flexible device priority management according to certain aspects disclosed herein.

FIG. 7 illustrates a first example of the operation of the dynamic SID implementation 700 that may enable flexible device priority management. A dynamic SID 704 repurposes the four bits of the slave address 702 defined by the RFFE or SPMI protocol. When the arbitration scheme assigns higher priority to higher value slave addresses, the two least significant bits of the slave address 702 may serve as a unique slave address (fixed ID 706) while the two most significant bits of the slave address 702 may be used as a variable ID 708 that may function as an arbitration failure counter, for example. The combination of parts of the dynamic SID 704 may support a layered priority scheme. In one example, the priority during each bus arbitration may be defined by a binary-weighted combination of value of the variable ID 708 and value of the fixed ID 706. In a more general case, the most significant portion may serve as a j-bit unique slave address, and the least significant portion serves as a k-bit arbitration failure counter, such that the number of bits defined by protocol for the slave ID is j+k bits. In some implementations, j=k, while in other implementations j≠k.

According to certain aspects of this disclosure, real-time dynamic addressing may guarantee a maximum delay before a device gains access to a primary bus 610. Bus access may be guaranteed to all devices within a prescribed time-limit through the use of the variable ID 708 as an arbitration failure counter. FIG. 7 illustrates the operation of a slave device 710 that maintains a dynamic SID 704. The timeline 720 illustrates an example where four devices contend for access in every available arbitration slot commencing with a first arbitration slot that begins at a first point in time 724 (T0). Prior to the first point in time 724, it is assumed that no device sought access to the serial bus.

In the first arbitration slot, each device enters arbitration with a priority defined by its fixed ID 706, with the variable ID 708 of each device being set to binary '00'. The priority scheme provides that the highest address has the highest priority. Accordingly, the device with a binary address '0011' (decimal 3) wins the first arbitration. In a device 710 that wins arbitration, arbitration success causes the bus arbitration failure counter 712 to be reset 716. In each device 710 that loses arbitration, the bus arbitration failure counter 712 increments the variable ID 708. Accordingly, each of the three devices with a binary address less than '0011' increments its variable ID 708.

A second arbitration slot commences at a second point in time 726 (T1). Three devices having failed to win the first arbitration enter the second arbitration with a priority defined by dynamic SIDs '0110', '0101' and '0100'. The device that won the first arbitration enters the second arbitration with a priority defined by the dynamic SID '0011'. Of the four devices contending for access to the serial bus in the second arbitration, the device with the dynamic SID '0110' wins the second arbitration. In a device 710 that wins arbitration, arbitration success causes the bus arbitration failure counter 712 to be reset 716, here to '0010'. In each device 710 that loses arbitration, the bus arbitration failure counter 712 increments the variable ID 708. Accordingly, each of the three devices that lost the second arbitration increments its variable ID 708.

A third arbitration slot commences at a third point in time 728 (T2). Two devices having failed to win the first and second arbitrations enter the third arbitration with a priority defined by dynamic SIDs '1001' and '1000', and the other device that lost the second arbitration enters the third arbitration with a priority defined by the dynamic SID '0111'. The device that won the second arbitration enters the third arbitration with a priority defined by the dynamic SID '0010'. Of the four devices contending for access to the serial bus in the third arbitration, the device with the dynamic SID 704 '1001' wins the third arbitration. In a device 710 that wins arbitration, arbitration success causes the bus arbitration failure counter 712 to be reset 716, here to '0001'. In each device 710 that loses arbitration, the bus arbitration failure counter 712 increments the variable ID 708. Accordingly, each of the three devices that lost the third arbitration increments its variable ID 708.

A fourth arbitration slot commences at a fourth point in time 730 (T3). One device has failed to win the first, second and third arbitrations and enters the fourth arbitration with a priority defined by the dynamic SID '1100'. One device has failed to win the second and third arbitrations and enters the fourth arbitration with a priority defined by the dynamic SID '1011'. One device has failed to win the third arbitration and enters the fourth arbitration with a priority defined by the dynamic SID '0110'. The device that won the third arbitration enters the fourth arbitration with a priority defined by the dynamic SID '0001'. Of the four devices contending for access to the serial bus in the fourth arbitration, the device with a dynamic SID '1100' wins the third arbitration. In a device 710 that wins arbitration, arbitration success causes the bus arbitration failure counter 712 to be reset 716, here to '0000'. In each device 710 that loses arbitration, the bus arbitration failure counter 712 increments the variable ID 708. Accordingly, each of the three devices that lost the fourth arbitration increments its variable ID 708.

Figure 8:
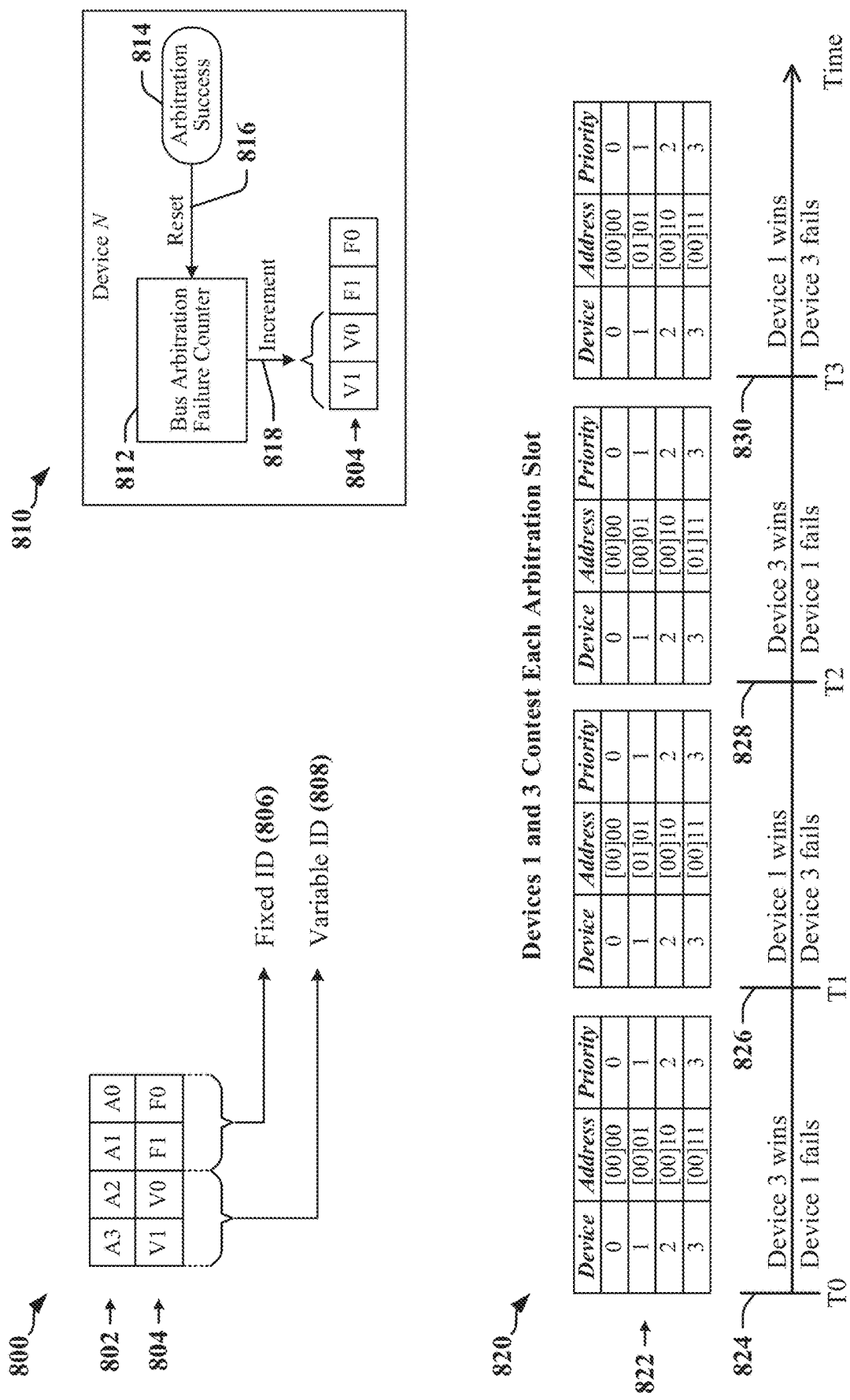
FIG. 8 illustrates a second example of the operation of the dynamic slave identifier implementation for flexible device priority management according to certain aspects disclosed herein.

FIG. 8 illustrates a second example of the operation of the dynamic SID implementation 800. A dynamic SID 804 repurposes the four bits of the slave address 802 defined by the RFFE or SPMI protocol. When the arbitration scheme assigns higher priority to higher value slave addresses, the two least significant bits of the slave address 802 may serve as a unique slave address (fixed ID 806) while the two most significant bits of the slave address 802 may be used as a variable ID 808 that may function as an arbitration failure counter, for example. The combination of parts of the dynamic SID 804 may support a layered priority scheme. In a more general case, the most significant portion may serve as a j-bit unique slave address, and the least significant portion serves as a k-bit arbitration failure counter, such that the number of bits defined by protocol for the slave ID is j+k bits. In some implementations, j=k, while in other implementations j≠k.

According to certain aspects of this disclosure, real-time dynamic addressing may guarantee a maximum delay before a device gains access to a primary bus 610. Bus access may be guaranteed to all devices within a prescribed time-limit through the use of the variable ID 808 as an arbitration failure counter. FIG. 8 illustrates the operation of a slave device 810 that maintains a dynamic SID 804. The timeline 820 illustrates an example where two devices contend for access in every available arbitration slot commencing with a first arbitration slot that begins at a first point in time 824 (T0). The other two devices do not participate in arbitration. Prior to the first point in time 824, it is assumed that no device sought access to the serial bus.

In the first arbitration slot, two devices enters arbitration with a priority defined by their fixed ID 806, with the variable ID 808 of each device being set to binary '00'. The priority values presented in this instance are '0011' and '0001'. The priority scheme provides that the highest address has the highest priority. Accordingly, the device with a binary address '0011' (decimal 3) wins the first arbitration. In a device 810 that wins arbitration, arbitration success causes the bus arbitration failure counter 812 to be reset 816. In each device 810 that loses arbitration, the bus arbitration failure counter 812 increments the variable ID 808. Accordingly, the device that fails to win arbitration increments its variable ID 808.

A second arbitration slot commences at a second point in time 826 (T1). The device that failed to win the first arbitration enters the second arbitration with a priority defined by the dynamic SID 804 '0101'. The device that won the first arbitration enters the second arbitration with a priority defined by the dynamic SID 804 '0011'. Of the two devices contending for access to the serial bus in the second arbitration, the device with the dynamic SID '0101' wins the second arbitration. In a device 810 that wins arbitration, arbitration success causes the bus arbitration failure counter 812 to be reset 816, here to '0001'. In the device 810 that wins arbitration, the bus arbitration failure counter 812 increments the variable ID 808. Accordingly, the device that lost the second arbitration increments its variable ID 808.

A third arbitration slot commences at a third point in time 828 (T2). The device that failed to win the second arbitration enters the third arbitration with a priority defined by the dynamic SID '0111'. The device that won the second arbitration enters the third arbitration with a priority defined by the dynamic SID 804 '0001'. Of the two devices contending for access to the serial bus in the third arbitration, the device with the dynamic SID '0111' wins the third arbitration. In a device 810 that wins arbitration, arbitration success causes the bus arbitration failure counter 812 to be reset 816, here to '0011'. In the device 810 that wins arbitration, the bus arbitration failure counter 812 increments the variable ID 808. Accordingly, the device that lost the third arbitration increments its variable ID 808.

A fourth arbitration slot commences at a fourth point in time 830 (T3). The device that failed to win the third arbitration enters the fourth arbitration with a priority defined by the dynamic SID '0101'. The device that won the third arbitration enters the fourth arbitration with a priority defined by the dynamic SID 804 '0011'. Of the two devices contending for access to the serial bus in the fourth arbitration, the device with the dynamic SID '0101' wins the fourth arbitration. In a device 810 that wins arbitration, arbitration success causes the bus arbitration failure counter 812 to be reset 816, here to '0001'. In the device 810 that wins arbitration, the bus arbitration failure counter 812 increments the variable ID 808. Accordingly, the device that lost the fourth arbitration increments its variable ID 808.

The variable ID 708, 808 may also be used when transactions are transmitted on a diversity bus 612. For example, when the device reaches a defined maximum consecutive arbitration loss count, the device may move the transaction to an available diversity bus 612. When a transaction is moved to the diversity bus 612, the transmitting device may participate in an arbitration process for the diversity bus 612 using a high priority ID, which may include the variable ID 808 value set to the maximum consecutive arbitration loss count for the primary bus 610.

In some instances, transfer to the diversity bus 612 may be initiated predictively. Predictive transfer may be initiated based on knowledge of current and/or ongoing transactions. A transmitting device may check availability of the diversity bus 612, which may be indicated by a Bus Idle Indicator. In one example, the Bus Idle Indicator may be implemented by latching bus state indicator set by a bus park cycle (BPC).

A transmitting device transferring a transaction to the diversity bus 612 may send the corresponding message to the interface to the diversity bus 612 with a Magic and/or Priority SID that ensures early transmission of the message. The Magic and/or Priority SID is a device ID that ensures that the message will win arbitration over other ordinary messages to be transmitted over the diversity bus 612. An arbitration process between Magic and/or Priority SIDs may be performed when one or more other messages assigned a Magic and/or Priority SID are contending for access to the diversity bus 612.

Figure 9:
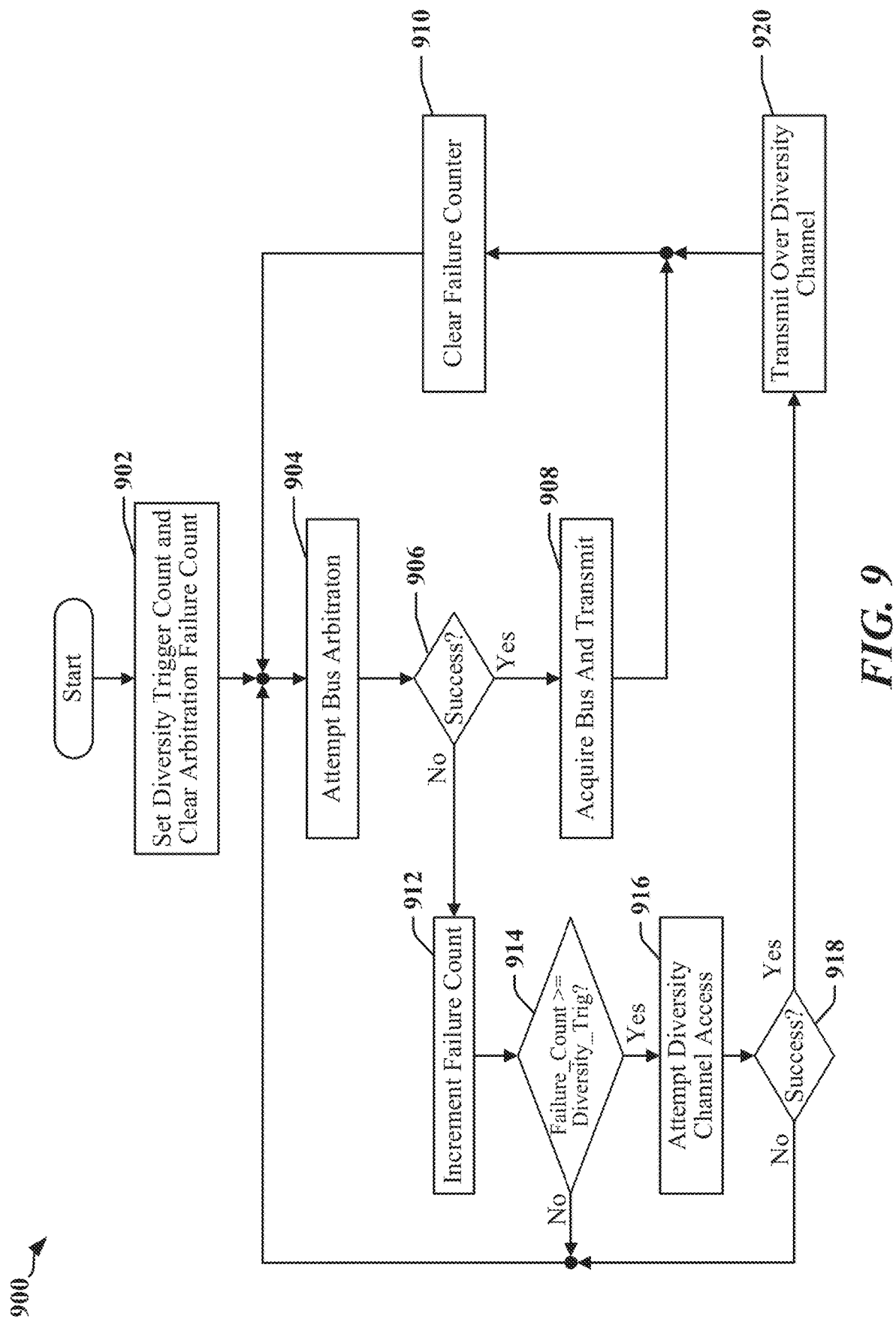
FIG. 9 is a flowchart that illustrates switchover to a diversity bus when triggered based on a consecutive arbitration failure in accordance with certain aspects disclosed herein.

FIG. 9 is a flowchart 900 that illustrates switchover to a diversity bus 612 when triggered based on a consecutive arbitration failure counter reaching a defined threshold value defining the maximum number of failures before switchover. When the defined threshold value is reached by the failure counter, the device may be allowed to access one or more other available buses for data transmission.

At block 902, a device seeking access to the primary bus 610 to transmit a message may initialize a threshold value for the diversity trigger and may clear the arbitration failure count to a zero value.

At block 904, the device may attempt to acquire the primary bus 610 through arbitration. If at block 906, the device determines that the arbitration was successful, the device acquires the primary bus 610 at block 908 and transmits the message before proceeding to block 910 where the failure counter is cleared and the device may repeat the process commencing at block 904.

If at block 906, the device determines that the arbitration was unsuccessful, the device increments the arbitration failure count at block 912.

At block 914, the device may determine whether the failure count equals or exceeds the threshold value for the diversity trigger. If the failure count is less than the threshold value for the diversity trigger, then the device repeats the process, including attempting another bus arbitration at block 904.

If the failure count is determined to equal or exceed the threshold value for the diversity trigger at block 814, the device may attempt to access the diversity bus 612 at block 916.

At block 918, the device may determine whether the attempt to access the diversity bus 612 was successful. If the diversity bus 612 was successfully acquired, then the device may transmit the message over the diversity bus 612 at block 920 before proceeding to block 910 where the failure counter is cleared and the device may repeat the process commencing at block 904. If the diversity bus 612 was not acquired, then the device repeats the process, including attempting another bus arbitration at block 904.

Certain aspects disclosed herein can guarantee that devices in a multi-drop bus configuration may contest for bus access, while a device with lower bus access priority due to its assigned address does not starve for bus access indefinitely. The device priority management scheme does not employ round robin scheduling and time is not wasted if a scheduled device not ready to use the primary bus 610. In the disclosed dynamic address management scheme, the use of bus access failure count enables a scheme in which priority is based on number of arbitrations lost, where priority increases with more losses. A programmable threshold value for bus access failure count may be used to trigger access to a diversity channel. In implementations where a high-priority device tends to occupy the primary bus most of the time, the techniques disclosed herein can guarantee bus access to all devices.

Examples of Processing Circuits and Methods

Figure 10:
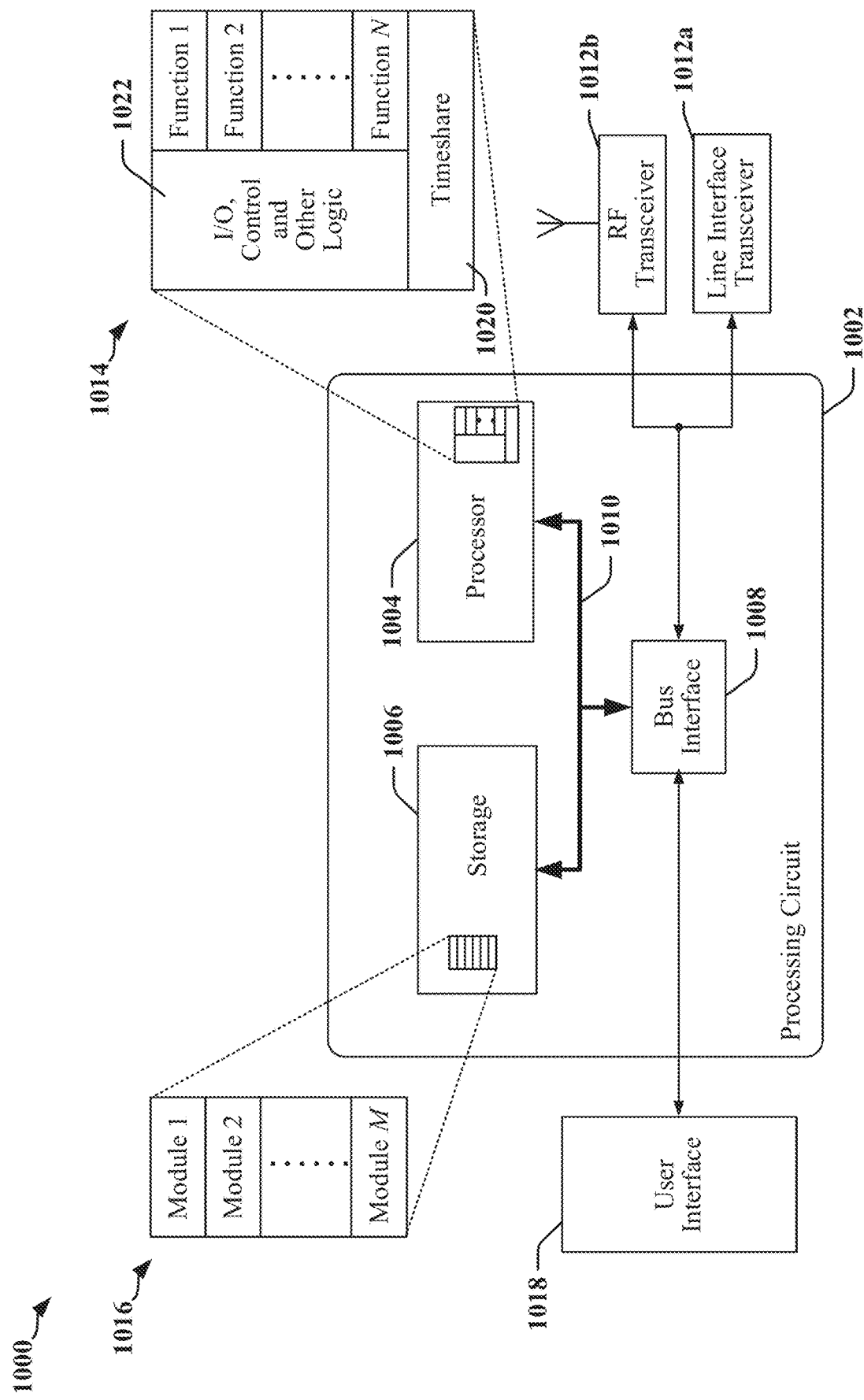
FIG. 10 illustrates one example of an apparatus employing a processing circuit that may be adapted according to certain aspects disclosed herein.

FIG. 10 is a diagram illustrating an example of a hardware implementation for an apparatus 1000. In some examples, the apparatus 1000 may perform one or more functions disclosed herein. In accordance with various aspects of the disclosure, an element, or any portion of an element, or any combination of elements as disclosed herein may be implemented using a processing circuit 1002. The processing circuit 1002 may include one or more processors 1004 that are controlled by some combination of hardware and software modules. Examples of processors 1004 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. The one or more processors 1004 may be configured through a combination of software modules 1016 loaded during initialization, and further configured by loading or unloading one or more software modules 1016 during operation.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices, and may be referred to herein as computer-readable media and/or processor-readable media. The bus 1010 may also link various other circuits such as timing sources, timers, peripherals, voltage regulators, and power management circuits. A bus interface 1008 may provide an interface between the bus 1010 and one or more transceivers 1012a, 1012b. A transceiver 1012a, 1012b may be provided for each networking technology supported by the processing circuit. In some instances, multiple networking technologies may share some or all of the circuitry or processing modules found in a transceiver 1012a, 1012b. Each transceiver 1012a, 1012b provides a means for communicating with various other apparatus over a transmission medium. In one example, a transceiver 1012a may be used to couple the apparatus 1000 to a multi-wire bus. In another example, a transceiver 1012b may be used to connect the apparatus 1000 to a radio access network. Depending upon the nature of the apparatus 1000, a user interface 1018 (e.g., keypad, display, speaker, microphone, joystick) may also be provided, and may be communicatively coupled to the bus 1010 directly or through the bus interface 1008.

A processor 1004 may be responsible for managing the bus 1010 and for general processing that may include the execution of software stored in a computer-readable medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement any one of the methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer-readable medium. The external computer-readable medium and/or storage 1006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1006 may also include, by way of example, a carrier wave, a transmission line, and any other suitable medium for transmitting software and/or instructions that may be accessed and read by a computer. Computer-readable medium and/or the storage 1006 may reside in the processing circuit 1002, in the processor 1004, external to the processing circuit 1002, or be distributed across multiple entities including the processing circuit 1002. The computer-readable medium and/or storage 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004, and may manage access to external devices such as a transceiver 1012*a*, 1012*b*, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to a transceiver 1012*a*, 1012*b*, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the transceiver 1012*a*, 1012*b*, and device drivers, for example. To support the performance of multiple functions, the one or more processors 1004 may be configured to provide a multitasking environment, whereby each of a plurality of functions is implemented as a set of tasks serviced by the one or more processors 1004 as needed or desired. In one example, the multitasking environment may be implemented using a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

Methods for optimizing virtual GPIO latency may include an act of parsing various input sources including sources of GPIO signal state, parameters and/or messages to be transmitted. The input sources may include hardware events, configuration data, mask parameters, and register addresses. Packet-specific latency estimators may be employed to estimate the latency for corresponding packet types based upon the parsed parameters. A packet type to be used for transmission may be selected based on the minimum latency calculated or determined for available packet types. The selected packet type may be identified using a command code, which may be provided to a packetizer with a payload to be transmitted. The command code may also reflect a protocol to be used to transmit the payload. In some implementations, the physical link used to transmit the payload may be operated according to different protocols or different variants of one or more protocols. The protocol to be used for transmitting the payload may be selected based on latencies associated with the various available protocols or variants of protocols.

Figure 11:
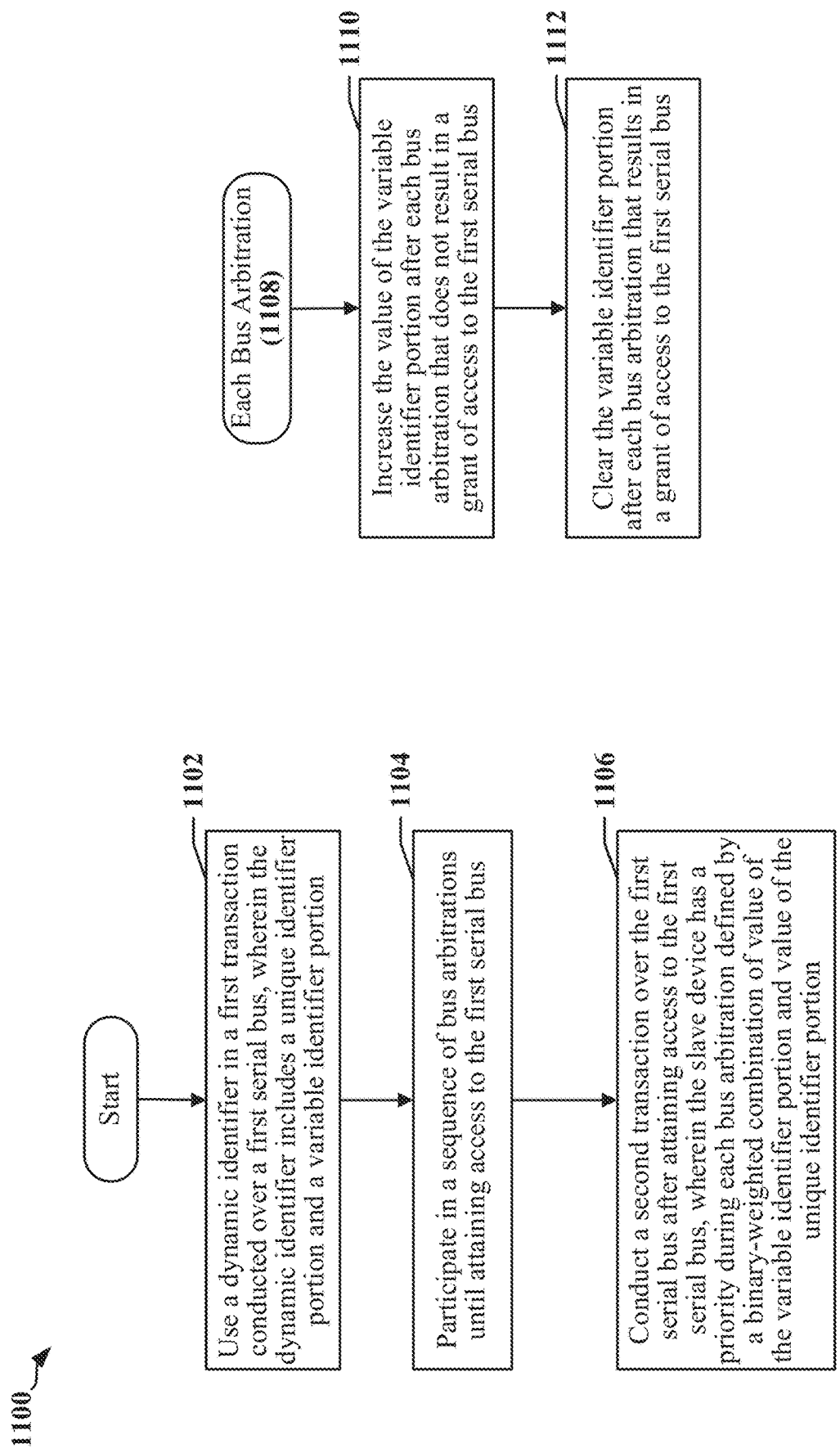
FIG. 11 is a flowchart that illustrates certain aspects disclosed herein.

FIG. 11 is a flowchart 1100 of a method that may be performed by a slave device coupled to one or more serial buses. Each serial bus may be operated in accordance with an I3C, RFFE, SPMI or other protocol. The serial buses may be operated in accordance with the same protocol or different protocols.

At block 1102, the slave device may use a dynamic identifier in a first transaction conducted over a first serial bus. The dynamic identifier may include a unique identifier portion and a variable identifier portion. In one example, the unique identifier portion may correspond to the fixed ID 706 in FIG. 7, the variable identifier portion may correspond to the variable ID 708 in FIG. 7 and the first serial bus may correspond to the primary bus 610 of FIG. 6.

At block 1104, the slave device may participate in a sequence of bus arbitrations until the slave device gains access to the first serial bus or a second serial bus. In each bus arbitration 1108 in the sequence of bus arbitrations, the slave device may increase the value of the variable identifier portion at block 1110 after each bus arbitration that does not result in a grant of access to the first serial bus, and may clear the variable identifier portion at block 1112 after each bus arbitration that results in a grant of access to the first serial bus. In one example, the slave device may successfully gain access to the first serial bus when the slave device has the highest priority dynamic identifier of all the devices contending for access to the first serial bus during a bus arbitration.

At block 1106, the slave device may conduct a second transaction over the first serial bus after gaining access to the first serial bus. The slave device may have a priority during each bus arbitration defined by a binary-weighted combination of value of the variable identifier portion and value of the unique identifier portion.

In one aspect, the variable identifier portion is cleared or ignored while the first transaction is being conducted. In certain implementations, the slave device may participate in the sequence of bus arbitrations further after initializing the variable identifier portion such that the unique identifier portion defines the initial priority of the slave device during a first bus arbitration in the sequence of bus arbitrations. In one example, the value of the variable identifier portion is increased by incrementing the variable identifier portion.

In certain examples, the slave device may conduct the second transaction over the second serial bus when the value of the variable identifier portion equals or exceeds a maximum value defined for the slave device. The slave device may request access to the second serial bus when the value of the variable identifier portion equals or exceeds a maximum value defined for the slave device. The slave device may continue participation in the sequence of bus arbitrations when access to the second serial bus is denied. The slave device may request access to the second serial bus using a high-priority identifier to participate in arbitration for access to the second serial bus.

In some instances, the slave device may terminate participation in the sequence of bus arbitrations after gaining access to the first serial bus. For example, the slave device may transmit all pending data in the second transaction. The slave device may participate in the sequence of bus arbitrations while the slave device has data to be transmitted to another device coupled to the first serial bus.

According to certain aspects, the dynamic identifier has a length defined for a slave identifier by a protocol used to manage communication over the first serial bus. In one example, the protocol is an RFFE protocol. In another example, the protocol is an SPMI protocol. In another example, the protocol is an I3C protocol.

Figure 12:
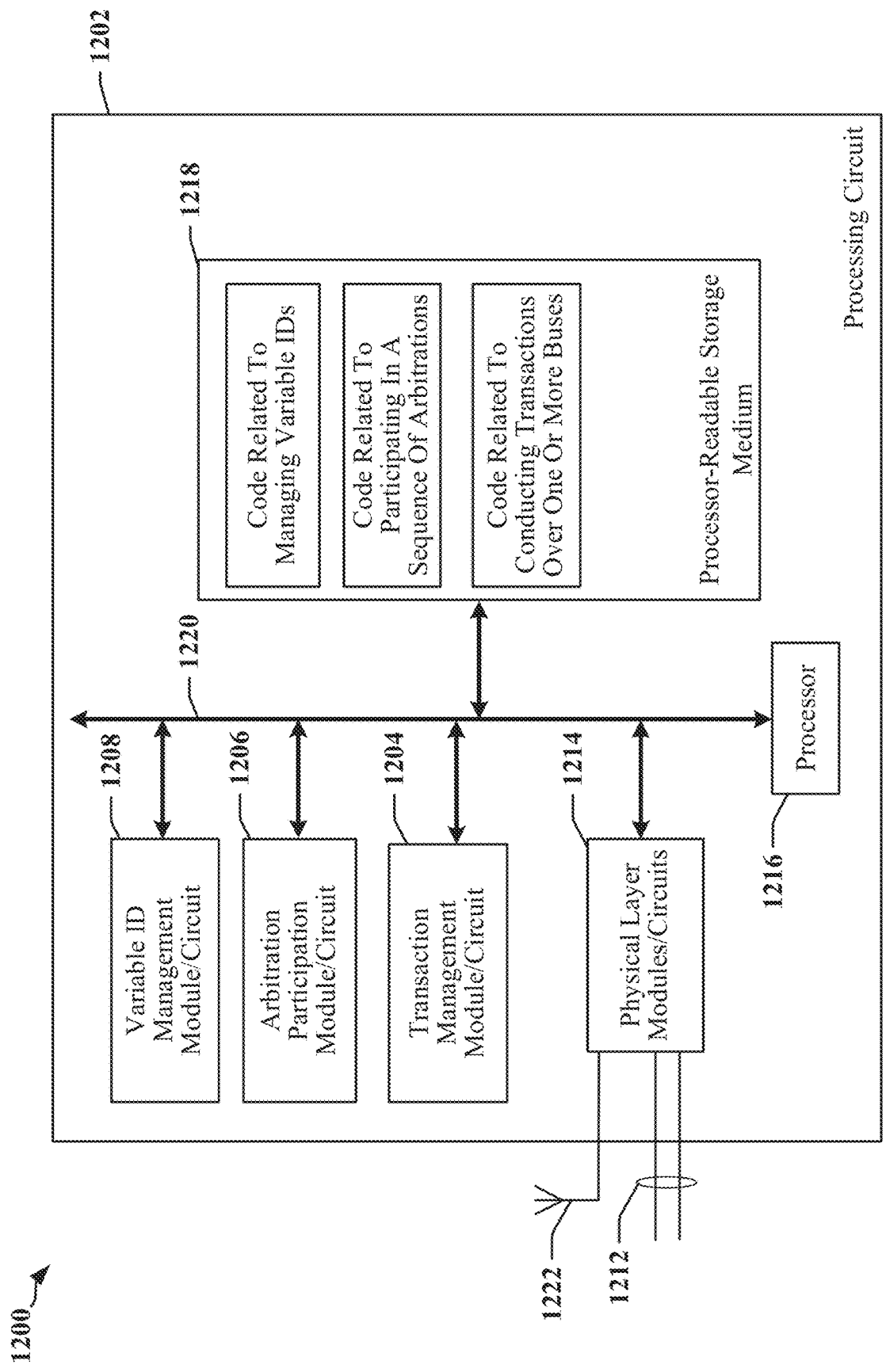
FIG. 12 illustrates an example of a hardware implementation for an apparatus adapted in accordance with certain aspects disclosed herein.

FIG. 12 is a diagram illustrating a simplified example of a hardware implementation for an apparatus 1200 employing a processing circuit 1202. The processing circuit typically has a controller or processor 1216 that may include one or more microprocessors, microcontrollers, digital signal processors, sequencers and/or state machines. The processing circuit 1202 may be implemented with a bus architecture, represented generally by the bus 1220. The bus 1220 may include any number of interconnecting buses and bridges depending on the specific application of the processing circuit 1202 and the overall design constraints. The bus 1220 links together various circuits including one or more processors and/or hardware modules, represented by the controller or processor 1216, the modules or circuits 1204, 1206 and 1208 and the processor-readable storage medium 1218. One or more physical layer circuits and/or modules 1214 may be provided to support communications over a communication link implemented using a multi-wire bus 1212, through an antenna 1222 (to a radio access network for example), and so on. The bus 1220 may also link various other circuits such as timing sources, peripherals, voltage regulators, and power management circuits, which are well known in the art, and therefore, will not be described any further.

The processor 1216 is responsible for general processing, including the execution of software, code and/or instructions stored on the processor-readable storage medium 1218. The processor-readable storage medium may include a non-transitory storage medium. The software, when executed by the processor 1216, causes the processing circuit 1202 to perform the various functions described supra for any particular apparatus. The processor-readable storage medium may be used for storing data that is manipulated by the processor 1216 when executing software. The processing circuit 1202 further includes at least one of the modules 1204, 1206 and 1208. The modules 1204, 1206 and 1208 may be software modules running in the processor 1216, resident/stored in the processor-readable storage medium 1218, one or more hardware modules coupled to the processor 1216, or some combination thereof. The modules 1204, 1206 and 1208 may include microcontroller instructions, state machine configuration parameters, or some combination thereof.

In one configuration, the apparatus 1200 includes modules and/or circuits 1208 adapted to manage a variable ID, including during an arbitration process that defines device priority according to relative values of slave IDs for slave devices participating in the arbitration process used to access a serial bus. The apparatus 1200 may include modules and/or circuits 1206 adapted to cause the slave device to participate in a bus arbitration or sequence of bus arbitrations. The apparatus 1200 may include modules and/or circuits 1204 adapted to configure, conduct and/or participate in a transaction over the serial bus.

In one example, the apparatus 1200 includes or operates as a slave device. The physical layer circuits and/or modules 1214 of the apparatus 1200 may implement an interface circuit adapted to couple the apparatus 1200 to one or more multi-wire buses 1212, including a first serial bus. The apparatus 1200 may have a processor configured to use a dynamic identifier in a first transaction conducted over a first serial bus. The dynamic identifier may include a unique identifier portion and a variable identifier portion. The processor may be configured to participate in a sequence of bus arbitrations until the slave device gains access to the first serial bus or a second serial bus. In each bus arbitration the processor may be configured to increase the value of the variable identifier portion after each bus arbitration that does not result in a grant of access to the first serial bus, and clear the variable identifier portion after each bus arbitration that results in a grant of access to the first serial bus. The processor may be configured to conduct a second transaction over the first serial bus after gaining access to the first serial bus. In certain examples, the slave device has a priority during each bus arbitration defined by value of the dynamic identifier.

In some instances, the variable identifier portion is cleared or ignored while the first transaction is being conducted. The processor may be configured to initialize the variable identifier portion such that the unique identifier portion defines the initial priority of the slave device during a first bus arbitration in the sequence of bus arbitrations. The apparatus may have a counter, adder, subtractor or other logic device configured to provide the variable identifier portion of the dynamic identifier. The processor may be configured to increase the value of the variable identifier portion after each bus arbitration by incrementing the counter.

In some examples, the processor is configured to conduct the second transaction over the second serial bus when the value of the variable identifier portion equals or exceeds a maximum value defined for the slave device. The processor may be configured to request access to the second serial bus when the value of the variable identifier portion equals or exceeds a maximum value defined for the slave device, and continue participation in the sequence of bus arbitrations when access to the second serial bus is denied. The processor may be configured to use a high-priority identifier to participate in arbitration for access to the second serial bus.

In some examples, the processor may be configured to terminate participation in the sequence of bus arbitrations after gaining access to the first serial bus. The slave device may participate in the sequence of bus arbitrations while the slave device has data to be transmitted to another device coupled to the first serial bus.

According to certain aspects, the dynamic identifier has a length defined for a slave identifier by a protocol used to manage communication over the first serial bus. In one example, the protocol is an RFFE protocol. In another example, the protocol is an SPMI protocol. In another example, the protocol is an I3C protocol.

The processor-readable storage medium 1218 may include transitory or non-transitory storage devices configured to store code, instructions and/or parameters used to implement one or more methods or procedures disclosed herein. The processor-readable storage medium 1218 may include code for using a dynamic identifier in a first transaction conducted over a first serial bus. The dynamic identifier may include a unique identifier portion and a variable identifier portion. The processor-readable storage medium 1218 may include code for participating in a sequence of bus arbitrations until the slave device gains access to the first serial bus or a second serial bus, including code for increasing the value of the variable identifier portion after each bus arbitration that does not result in a grant of access to the first serial bus, and code for clearing the variable identifier portion after each bus arbitration that results in a grant of access to the first serial bus. The processor-readable storage medium 1218 may include code for conducting a second transaction over the first serial bus after gaining access to the first serial bus. The slave device has a priority during each bus arbitration defined by value of the dynamic identifier.

The processor-readable storage medium 1218 may include code for initializing the variable identifier portion such that the unique identifier portion defines the initial priority of the slave device during a first bus arbitration in the sequence of bus arbitrations.

The processor-readable storage medium 1218 may include code for conducting the second transaction over the second serial bus when the value of the variable identifier portion equals or exceeds a maximum value defined for the slave device.

The processor-readable storage medium 1218 may include code for conducting the second transaction over the second serial bus when the value of the variable identifier portion equals or exceeds a maximum value defined for the slave device.

The processor-readable storage medium 1218 may include code for requesting access to the second serial bus when the value of the variable identifier portion equals or exceeds a maximum value defined for the slave device, and for continuing participation in the sequence of bus arbitrations when access to the second serial bus is denied.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method of data communications at a slave device, comprising:
   using a dynamic identifier of the slave device in a first transaction conducted over a first serial bus, wherein the dynamic identifier includes a unique identifier portion and a variable identifier portion;
   participating in a sequence of address-based bus arbitrations until the slave device is granted access to the first serial bus or a second serial bus by a bus master that controls communication on the first serial bus or the second serial bus respectively, including:
      increasing a value of the variable identifier portion after each bus arbitration that does not result in a grant of access to the first serial bus; and
      clearing the variable identifier portion after each bus arbitration that results in the grant of access to the first serial bus; and
   conducting a second transaction over the first serial bus after gaining access to the first serial bus,
   wherein the slave device has a priority during each bus arbitration defined by a binary-weighted combination of the value of the variable identifier portion and a value of the unique identifier portion.

2. The method of claim 1, wherein the variable identifier portion is cleared or ignored while the first transaction is being conducted.

3. The method of claim 1, wherein participating in the sequence of bus arbitrations further includes:
   initializing the variable identifier portion such that the unique identifier portion defines an initial priority of the slave device during a first bus arbitration in the sequence of bus arbitrations.

4. The method of claim 1, wherein increasing the value of the variable identifier portion comprises:
   incrementing the variable identifier portion.

5. The method of claim 1, further comprising:
   conducting the second transaction over the second serial bus when the value of the variable identifier portion equals or exceeds a maximum value defined for the slave device.

6. The method of claim 1, further comprising:
   requesting access to the second serial bus when the value of the variable identifier portion equals or exceeds a maximum value defined for the slave device; and
   continuing participation in the sequence of bus arbitrations when access to the second serial bus is denied.

7. The method of claim 6, wherein requesting access to the second serial bus comprises:
   using a high-priority identifier to participate in arbitration for access to the second serial bus.

8. The method of claim 1, further comprising:
   terminating participation in the sequence of bus arbitrations after gaining access to the first serial bus.

9. The method of claim 1, wherein the slave device participates in the sequence of bus arbitrations while the slave device has data to be transmitted to another device coupled to the first serial bus.

10. The method of claim 1, wherein the dynamic identifier has a length defined for a slave identifier by a protocol used to manage communication over the first serial bus.

11. A slave device comprising:
   an interface circuit adapted to couple the slave device to a first serial bus; and
   a processor configured to:
      use a dynamic identifier of the slave device in a first transaction conducted over the first serial bus, wherein the dynamic identifier includes a unique identifier portion and a variable identifier portion;
      participate in a sequence of address-based bus arbitrations until the slave device is granted access to the first serial bus or a second serial bus by a bus master that controls communication on the first serial bus or the second serial bus respectively, by:
         increasing a value of the variable identifier portion after each bus arbitration that does not result in a grant of access to the first serial bus; and clearing the variable identifier portion after each bus arbitration that results in the grant of access to the first serial bus; and conduct a second transaction over the first serial bus after gaining access to the first serial bus, wherein the slave device has a priority during each bus arbitration defined by a binary-weighted combination of the value of the variable identifier portion and a value of the unique identifier portion.

12. The slave device of claim 11, wherein the variable identifier portion is cleared or ignored while the first transaction is being conducted.

13. The slave device of claim 11, wherein the processor is further configured to:

initialize the variable identifier portion such that the unique identifier portion defines an initial priority of the slave device during a first bus arbitration in the sequence of bus arbitrations.

14. The slave device of claim 11, further comprising:

a counter configured to provide the variable identifier portion of the dynamic identifier, wherein the processor increases the value of the variable identifier portion after each bus arbitration by incrementing the counter.

15. The slave device of claim 11 wherein the processor is further configured to:

conduct the second transaction over the second serial bus when the value of the variable identifier portion equals or exceeds a maximum value defined for the slave device.

16. The slave device of claim 11, wherein the processor is further configured to:

request access to the second serial bus when the value of the variable identifier portion equals or exceeds a maximum value defined for the slave device; and continue participation in the sequence of bus arbitrations when access to the second serial bus is denied.

17. The slave device of claim 16, wherein the processor is further configured to:

use a high-priority identifier to participate in arbitration for access to the second serial bus.

18. The slave device of claim 11, wherein the processor is further configured to:

terminate participation in the sequence of bus arbitrations after gaining access to the first serial bus.

19. The slave device of claim 11, wherein the slave device participates in the sequence of bus arbitrations while the slave device has data to be transmitted to another device coupled to the first serial bus.

20. The slave device of claim 11, wherein the dynamic identifier has a length defined for a slave identifier by a protocol used to manage communication over the first serial bus.

21. A non-transitory processor-readable storage medium comprising code for:

using a dynamic identifier of a slave device in a first transaction conducted over a first serial bus, wherein the dynamic identifier includes a unique identifier portion and a variable identifier portion;

participating in a sequence of address-based bus arbitrations until the slave device is granted access to the first serial bus or a second serial bus by a bus master that controls communication on the first serial bus or the second serial bus respectively, including code for:

increasing a value of the variable identifier portion after each bus arbitration that does not result in a grant of access to the first serial bus; and clearing the variable identifier portion after each bus arbitration that results in the grant of access to the first serial bus; and conducting a second transaction over the first serial bus after gaining access to the first serial bus, wherein the slave device has a priority during each bus arbitration defined by a binary-weighted combination of the value of the variable identifier portion and a value of the unique identifier portion.

22. The storage medium of claim 21, further comprising code for:

initializing the variable identifier portion such that the unique identifier portion defines an initial priority of the slave device during a first bus arbitration in the sequence of bus arbitrations.

23. The storage medium of claim 21, further comprising code for:

conducting the second transaction over the second serial bus when the value of the variable identifier portion equals or exceeds a maximum value defined for the slave device.

24. The storage medium of claim 21, further comprising code for:

requesting access to the second serial bus when the value of the variable identifier portion equals or exceeds a maximum value defined for the slave device; and continuing participation in the sequence of bus arbitrations when access to the second serial bus is denied.

25. The storage medium of claim 21, wherein the dynamic identifier has a length defined for a slave identifier by a protocol used to manage communication over the first serial bus.

26. An apparatus comprising:

means for modifying a dynamic identifier of a slave device, wherein the dynamic identifier is used in a first transaction conducted over a first serial bus, and wherein the dynamic identifier includes a unique identifier portion and a variable identifier portion;

means for participating in a sequence of address-based bus arbitrations, wherein participation in the sequence of bus arbitrations continues until the apparatus is granted access to the first serial bus or a second serial bus by a bus master that controls communication on the first serial bus or the second serial bus respectively; and means for conducting transactions over the first serial bus, wherein a second transaction is conducted after the apparatus has gained access to the first serial bus, wherein the apparatus has a priority during each bus arbitration defined by a value of the dynamic identifier, and wherein the means for modifying the dynamic identifier is configured to increase a value of the variable identifier portion after each bus arbitration that does not result in a grant of access to the first serial bus, and clear the variable identifier portion after each bus arbitration that results in the grant of access to the first serial bus.

27. The apparatus of claim 26, wherein the means for modifying the dynamic identifier is configured to:

initialize the variable identifier portion such that the unique identifier portion defines an initial priority of the apparatus during a first bus arbitration in the sequence of bus arbitrations.

28. The apparatus of claim 26, further comprising:

means for conducting transactions over the second serial bus, wherein the second transaction is conducted over the second serial bus when the value of the variable identifier portion equals or exceeds a maximum value defined for the apparatus.

29. The apparatus of claim 28, wherein the means for conducting transactions over the second serial bus is configured to request access to the second serial bus when the value of the variable identifier portion equals or exceeds the maximum value defined for the apparatus, and wherein participation in the sequence of bus arbitrations is continued when access to the second serial bus is denied.

30. The apparatus of claim 26, wherein the dynamic identifier has a length defined for a slave identifier by a protocol used to manage communication over the first serial bus.

* * * * *